United States Patent [19]

Mikulas, Jr. et al.

[11] Patent Number: 4,677,803

[45] Date of Patent: Jul. 7, 1987

[54] DEPLOYABLE GEODESIC TRUSS STRUCTURE

[75] Inventors: Martin M. Mikulas, Jr., Poquoson; Marvin D. Rhodes; J. Wayne Simonton, both of Yorktown, all of Va.

[73] Assignee: The United States of America as represented by the Administrator of the National Aeronautics and Space Administration, Washington, D.C.

[21] Appl. No.: 831,371

[22] Filed: Feb. 20, 1986

[51] Int. Cl.⁴ .......................................... E04H 12/18
[52] U.S. Cl. .................................. 52/646; 52/108; 52/632; 182/152
[58] Field of Search ................ 52/108, 109, 632, 645, 52/646; 182/152

[56] References Cited

U.S. PATENT DOCUMENTS

| | | | |
|---|---|---|---|
| 1,947,647 | 2/1934 | Holden | 52/109 |
| 2,697,845 | 12/1954 | Broner | 182/152 |
| 4,017,932 | 4/1977 | Lotto | 182/152 |
| 4,089,147 | 5/1978 | Bain | 52/108 |
| 4,480,415 | 11/1984 | Truss | 52/108 |
| 4,539,786 | 9/1985 | Nelson | 52/645 |
| 4,578,919 | 4/1986 | Amadon | 52/108 |

*Primary Examiner*—Henry E. Raduazo
*Attorney, Agent, or Firm*—George F. Helfrich; Wallace J. Nelson; John R. Manning

[57] ABSTRACT

A deployable geodesic truss structure can be deployed from a stowed state to an erected state. The truss structure includes a series of bays, each bay having sets of battens connected by longitudinal cross members which give the bay its axial and torsional stiffness. The cross members are hinged at their mid point by a joint so that the cross members are foldable for deployment or collapsing. The bays are deployed and stabilized by actuator means connected between the mid point joints of the cross members. Hinged longerons may be provided to also connect the sets of battens and to collapse for stowing with the rest of the truss structure.

11 Claims, 6 Drawing Figures

DEPLOYABLE GEODESIC TRUSS STRUCTURE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to a truss structure for deployment from a collapsed state to an elongated erected state.

DESCRIPTION OF THE PRIOR ART

Truss structures which can be carried or stowed as a relatively small package and deployed to a full erected state are required in many applications. For example, efficiently packaged deployable boom structures are necessary for many space satellite applications, especially large area space structures. Other typical applications for deployable boom structures include space cranes, remote manipulator arms, masts to support and accurately position feed horns for large antennas, to deploy and provide tension in large solar arrays, or to serve as structural components of a space operations center. Deployable truss structures may also find use in scaffolding, light service deployable bridges, cherry-picker or fire truck uses, among others.

Various deployable structures are known but only a few such structures have the capability of serving a structural function when only partially deployed. Moreover, the known structures must be deployed and retracted parallel to the longitudinal axis of the truss structure.

SUMMARY OF THE INVENTION

Accordingly, one object of the present invention is to provide a deployable geodesic truss structure which is efficiently packaged yet can be deployed or retracted in a serpentinous manner so as to be highly maneuverable.

Another object of the present invention is to provide a deployable geodesic truss structure which has the capacity of acting as an articulating structure, remote manipulator arm, or the like.

Another object of the present invention is to provide a deployable geodesic truss structure having foldable axial longerons for providing axial stiffness to the truss which is automatically deployable along the axis without articulation.

A still further object of the present invention is to provide a deployable geodesic truss structure which uses deployment energy stored in actuators during the collapsed or stowed state.

In accordance to one aspect of the present invention, we provide a deployable geodesic truss structure for movement between a collapsed or stowed state and an elongated erected state. The structure comprises a series of bays. Each bay is formed by connecting sets of battens by longitudinal cross members which give a bay its axial and torsional stiffness. The cross members are hinged at their mid point by a joint so that the cross members are foldable for deployment or collapsing. The bays are deployed and stabilized by actuator members connected between the mid point joints of the cross members. The truss structure can be formed using a number of geometrical relations for the battens, actuators and cross members, but, according to this aspect of the invention, the battens and actuators each form the legs of an equilateral triangle and the cross members join the sets of battens so that two intersecting cross members form two isoceles triangles with the battens.

According to another aspect of the invention, we provide a deployable truss structure having a first equilateral triangle formed by three battens connected at their ends by first, second and third joint means; a second equilateral triangle similar to the first but spaced from the first triangle and having fourth, fifth and sixth joint means; six cross members connected so that a first cross member extends from the first to the sixth joint means, a second cross member extends from the third to the fourth joint means, a third cross member extends from the first to the fifth joint means, a fourth cross member extends from the second to the fourth joint means, a fifth cross member extends from the second to the sixth joint means and a sixth cross member extends from the third to the fifth joint means; the first and second, third and fourth and fifth and sixth cross members being connected by seventh, eighth and ninth joint means, respectively; three actuator means connected at their ends by said seventh through ninth joint means, the actuator means each having an elongated member and means to vary the length of the member whereby the position in space of the first through ninth joint means can be varied from a compact stowed position to an erected position.

In one embodiment of the invention, the first through sixth joint means each comprise a joint body, means for connecting from two to four batten ends to the joint body and means for connecting the ends of two cross members to the body. Further, the seventh through ninth joint means each comprise a hinge body, ball and socket joint means at opposite ends of the body, means on said ball and socket for movably connecting with the intermediate ends of the cross members, and means for movably connecting the ends of two actuator means to the hinge body. Further, the battens and cross members are hollow and tubular and each actuator means has a rod telescoped within a tubular section.

In another embodiment of the invention, three hinged longerons are connected respectively between the first and fourth, third and sixth and second and fifth joint means. Further, hinge means are provided at the mid point of the length of the longerons so that the longerons can fold at the hinge means for stowing or erecting the structure.

Other objects and advantages of the invention will be evident to those skilled in the art from the following description taken in connection with the accompanying drawings wherein there is shown by way of illustration preferred embodiments of the invention.

DESCRIPTION OF THE PREFERRED EMBODIMENTS

Figure 1:
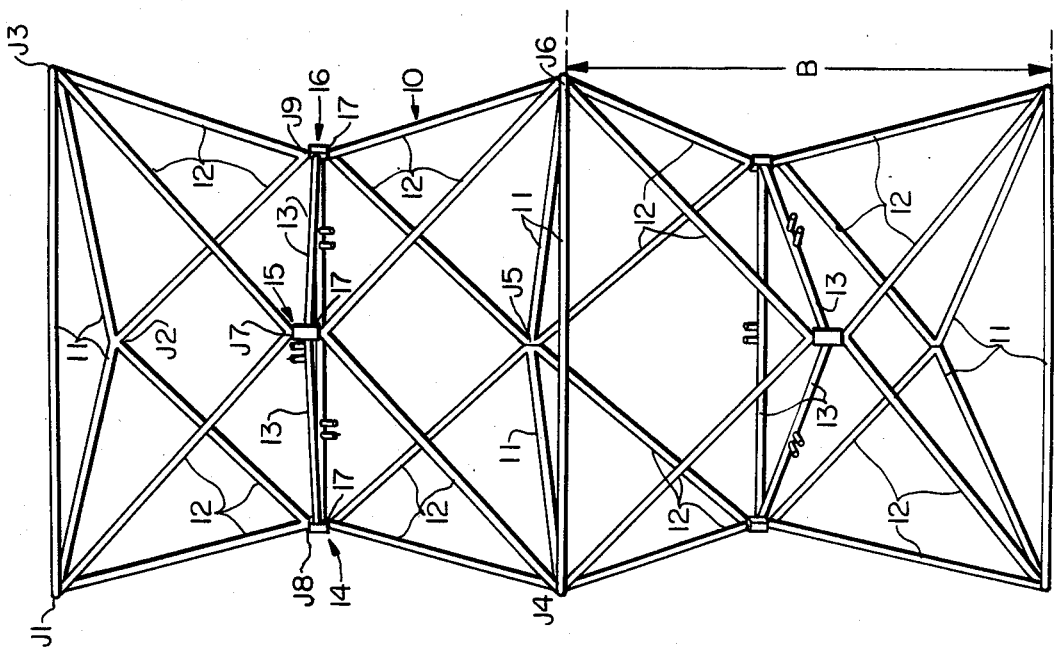
FIG. 1 is a perspective view of one embodiment of the present invention illustrating the use of two deployed bays.

FIG. 1 illustrates a two bay deployed geodesic truss structure 10 according to one embodiment of the present invention. Each bay B is formed by connecting sets of battens 11 by longitudinal cross members 12 which give the bay its axial and torsional stiffness. The cross members 12 are hinged at their midpoint at points 14, 15 and 16. The bays are deployed and stabilized by actuator means 13 connected between the mid point joint means 17 of the cross members 12. In FIG. 1, the battens 11 form an equilateral triangle and the cross members 12 that control the deployed height are hinged at their center. The cross members are connected so that a first cross member extends from the first joint means J1 to the sixth joint means J6, a second cross member extends from the third joint means J3 to the fourth joint means J4, a third cross member extends from the first joint means J1 to the fifth joint means J5, a fourth cross member extends from the second joint means J2 to the fourth joint means J4, a fifth cross member extends from the second joint means J2 to the sixth joint means J6 and a sixth cross member extends from the third joint means J3 to the fifth joint means. As seen in FIG. 1, nine joint means (J1–J9) are used in the bay.

The geodesic truss structure is fabricated from tubular members and, in the collapsed state (See FIG. 5), the stack height of the package is nominally controlled by the diameter of the cross members and the members of the actuator means. The packaging efficiency (ratio of deployed height to stowed height) is a function of design requirements. However, packaging efficiencies of twenty or greater should be easily obtainable.

Figure 2:
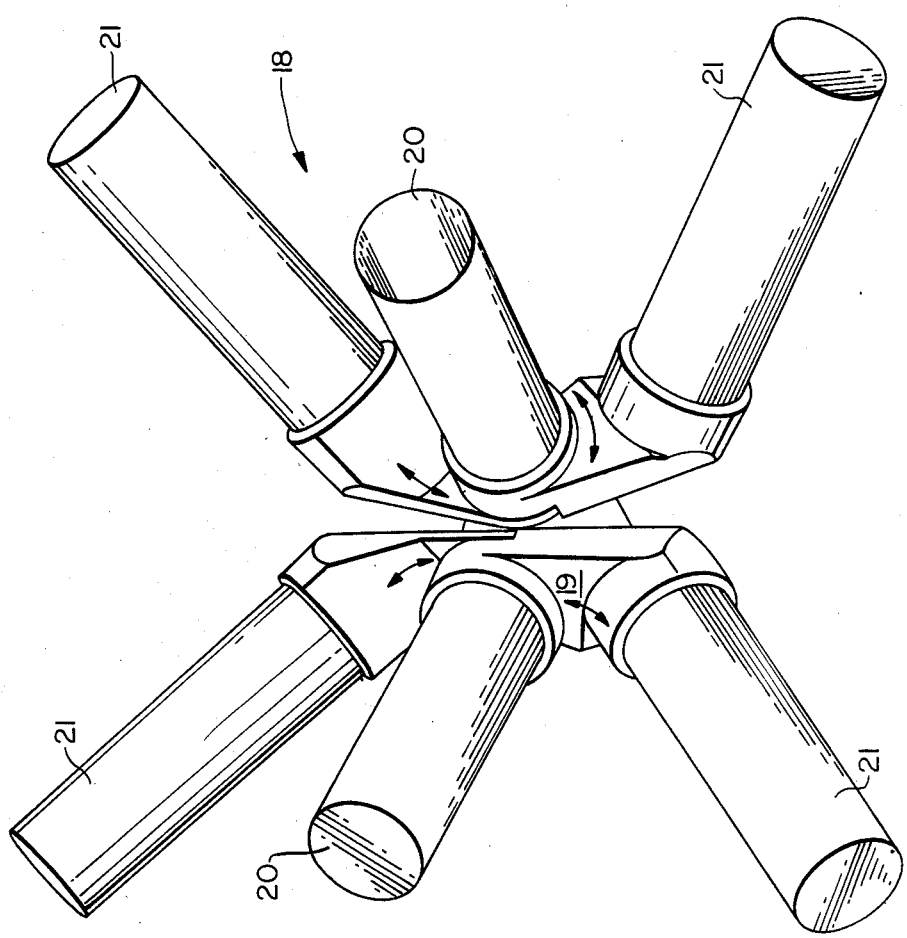
FIG. 2 is a perspective view of one of the joints for connecting the ends of two battens and four cross members.

FIG. 2 illustrates a typical joint means 18 for connecting the ends of two battens 11 and the ends of four cross members 12. The battens 11 are fixed to the joint means and are not required to rotate. The cross members 12 are rotatably mounted to rotate (as shown by arrows) about a line along the batten axis. As best seen in FIG. 2, the joint means has a joint body 19, means 20 for connecting two batten ends to the body and means 21 for connecting the ends of four cross members to the body. As illustrated, the means for connecting the batten and cross member ends are cylindrical members adapted to be insertable into the hollow interior of the ends of the battens 11 and cross members 12.

Figure 3:
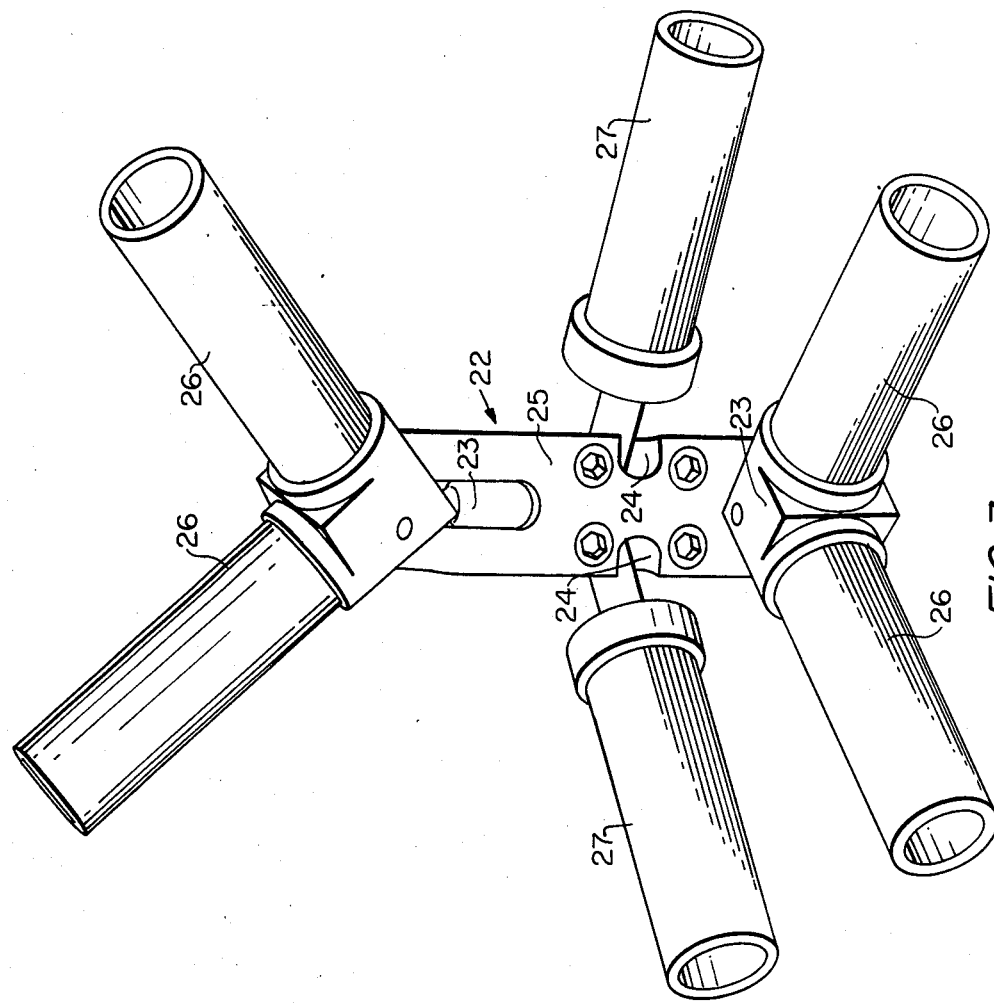
FIG. 3 is a perspective view of one of the joints for connecting the intermediate ends of four cross members and two actuator means.

FIG. 3 illustrates a typical joint means 22 for connecting the intermediate ends of the cross members 12 and the ends of two of the actuator means 13. The necessary mobility of the cross members 12 is obtained by a ball and socket 23 and the actuators are hinged at 24 on the socket body 25. Loading eccentricities to the joint means 22 which are introduced through the top and bottom cross members are reacted by bending of the actuator means 13. FIG. 3 shows the joint means 22 including a hinge body 25, ball and socket joint means 23 at opposite ends of the body, means 26 attached to the ball and socket joint means for connecting with the intermediate ends of the cross members 12, and means 27 for movably connecting the ends of two actuator means 13 to said hinge body by way of hinges 24. In the figure, the means for connecting the cross members and actuator means are cylindrical members 26 and 27 adapted to be insertable into the hollow interior of the ends of the cross members 12 and the tubular end of the actuator means 13.

Figure 4:
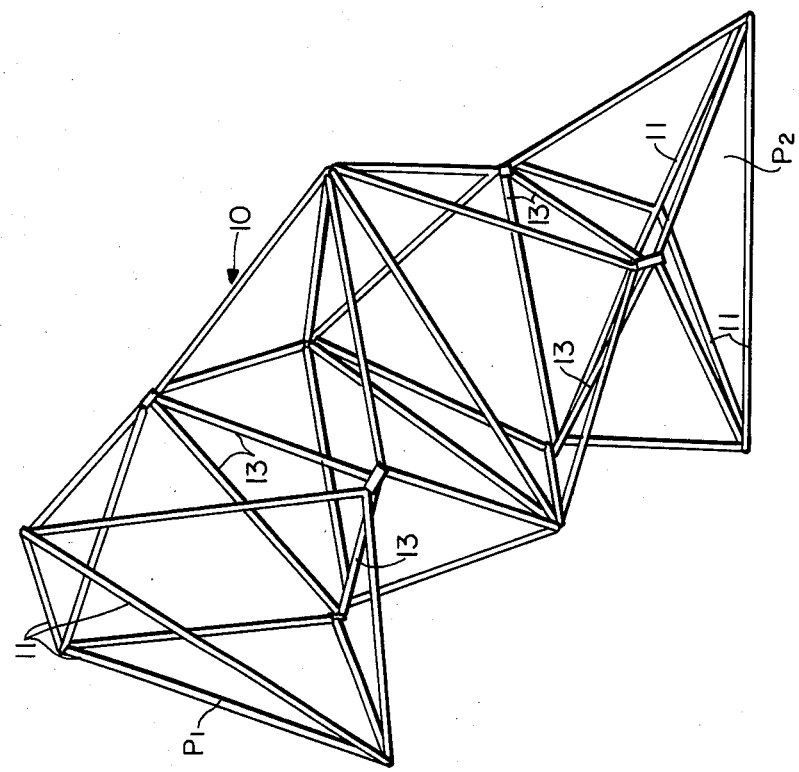
FIG. 4 is a perspective view of the deployed embodiment of FIG. 1 wherein the end of the truss structure is canted to illustrate the maneuverability of the structure of this embodiment.

FIG. 4 is a view similar to FIG. 1 of a deployed geodesic truss structure of one embodiment of the present invention. FIG. 4 demonstrates the maneuverability of the present invention. In the figure, a plane P1 through the three battens 11 at the top is canted about 60' to the plane P2 through the three battens 11 at the base resting on the ground. By changing the length of the actuator means 13, a point in the center of the equilateral triangle formed by the battens at the top of the two bay structure may be placed at virtually any position within the conical region where the vertex of the cone is at the base. When the actuator means 13 are locked, the truss structure 10 has a high axial and torsional stiffness at any position within the same conical region. The maneuverability of the disclosed embodiment provides the advantage that the embodiment may be used as part of an articulating structure or remote manipulator.

Figure 5:
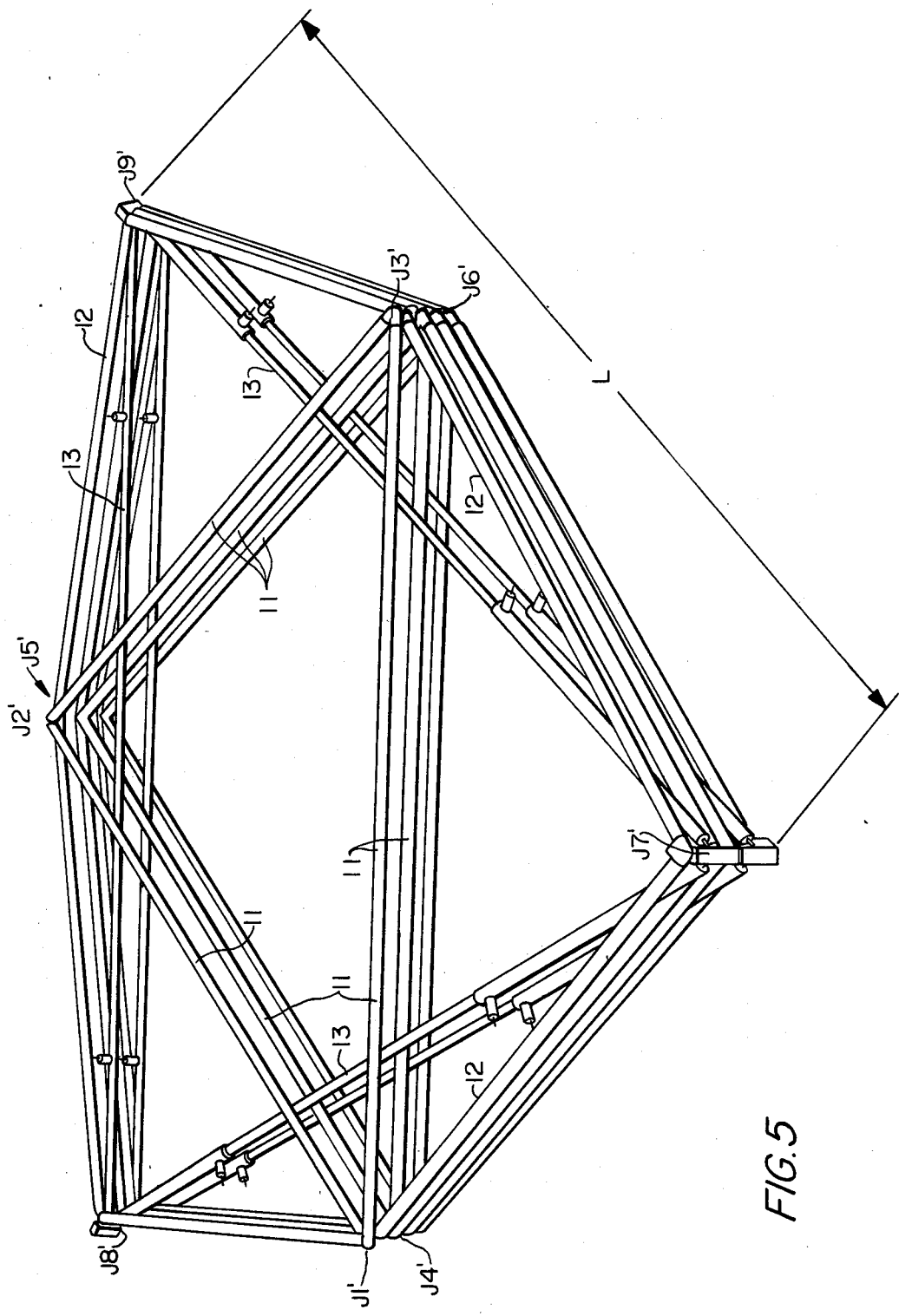
FIG. 5 is a perspective view of the embodiment of FIG. 1 when it is in the collapsed or stowed state.

FIG. 5 is an illustration of the embodiment of FIG. 1 when it is in the collapsed or stowed state. As illustrated, the actuator means 13 have been extended to the full length L, and the equilateral triangles defined by the battens 11 overlie one another. Finally, the cross members 12 have been rotated and pivoted into a substantially adjacent plane with the battens 11 and other cross-members 12. For the sake of clarity, like joint means in comparison to FIG. 1 have been marked with a prime to show the substantial change in the location of the first through ninth joint means between the deployed and stowed state.

Figure 6:
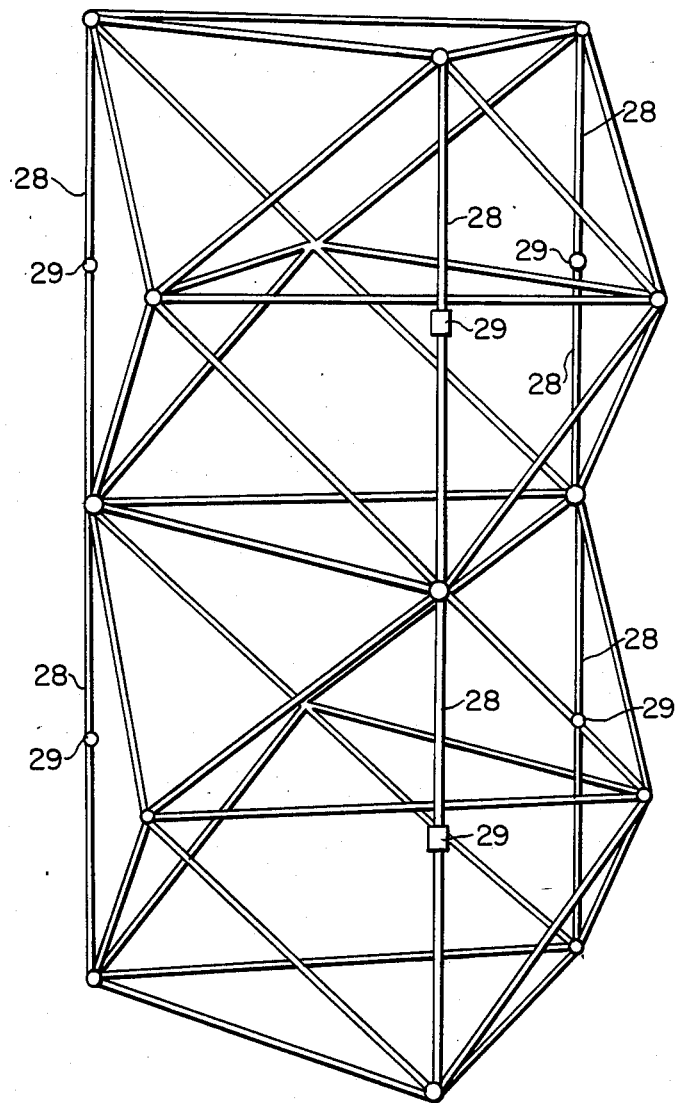
FIG. 6 is a diagramatic view of another embodiment of the present invention illustrating the use of hinged longerons extending along the two bays.

FIG. 6 is a diagramatic view of another embodiment of the present invention. The embodiment follows the one shown in FIGS. 1–5 but also includes hinged longerons 28 along the length of the structure. By using the longerons 28, the truss deploys automatically along the truss axis and does not articulate. The use of longerons along the truss axis contribute substantially to the axial stiffness. The longerons 28 hinge at their mid point 29 to fold for collapsing the truss structure. The truss may be deployed by releasing energy stored in elastic bands within the actuator means 13. When the longerons 28 are fully deployed with the hinges locked, the actuator means 13 also latch to form a stiff, stable structure. With the cross members straight (cross members lie in the plane formed by the longerons and battens) the alternate embodiment is similar to the double laced lattice column but differs from that column by the use of stored energy in the actuator means. An additional advantage results if the cross members are not straight (e.g. the cross members are slightly longer so that the mid point joints lie outside the plane formed by the longerons and battens). In that case, the distribution of axial load between the longerons and cross members can be controlled. Also, any free play in the truss structure due to joint tolerances will be removed if the actuator means have sufficient stored energy to pretension the longerons. The latter will result in a truss structure that can be deployed repeatedly in a gravity-free environment and the position of the end of the truss structure relative to the base will be the same after each deployment.

Although particular embodiments of the invention have been described and illustrated herein, it is recognized that modifictions and variations may readily occur to those skilled in the art, and, thus, it is intended that the claims be interpreted to cover such modifications and equivalents.

We claim:

1. A deployable geodesic truss structure for movement between a collapsed stowed state and an elongated erected state comprising:

a first equilateral triangle formed by three battens connected at their ends by first, second, and third joint means;

a second equilateral triangle formed by three battens connected at their ends by fourth, fifth and sixth joint means;

said first and second equilateral triangles being spaced from one another;

six longitudinal cross members connected between said first, second and third joint means and said fourth, fifth and sixth joint means, said cross members being connected so that a first cross member extends from said first joint to said sixth joint, a second cross member extends from said third joint to said fourth joint, a third cross member extends from said first joint to said fifth joint, a fourth cross member extends from said second joint to said fourth joint, a fifth cross member extends from said second to said sixth joint and a sixth cross member extends from said third joint to said fifth joint;

the first and second cross members being connected by a seventh joint means intermediate their lengths, the third and fourth cross members being connected by an eighth joint member intermediate their lengths and said fifth and sixth cross members being connected by ninth joint means intermediate their lengths;

three actuator means connected to their ends by said seventh, eighth, and ninth joint means, said actuator means each having an elongated member and means to vary the length of said member whereby the position in space of said seventh, eighth, and ninth joint means can be varied from a compact stowed position wherein all nine of the joints of said structure are spaced into a position where all said joints are substanially adjacent to the same plane with joint pairs one and four; two and five; and three and six each substanially adjacent to three points on said plane to an erected position wherein the first through third, fourth through sixth and seventh through ninth joints of the structure are substanially spaced from one another.

2. The invention of claim 1 wherein said first through sixth joint means each comprise a joint body means for connecting two batten ends to said body and means for rotatably connecting the ends of two longitudinal cross members to said body.

3. The invention of claim 2 further comprising means for rotatably connecting the ends of four longitudinal cross members to said body.

4. The invention of claim 2 wherein said joint body and said means for connecting two batten ends thereto are relatively fixed and said means for connecting the ends of longitudinal cross members to said body are relatively movable to allow for relative movement when one of said actuation means is operated.

5. The invention of claim 3 wherein said joint body and said means for connecting two batten ends thereto are relatively fixed and said means for connecting the ends of longitudinal cross members to said body are relatively movable to allow for relative movement when one of said actuation means is operated.

6. The invention of claim 1, wherein said seventh through ninth joint means each comprise: a hinge body; ball and socket joint means at opposite ends of said body; means attached to said ball and socket joint means for movably connecting with the intermediate ends of said longitudinal cross members; and means for movably connecting the ends of two actuator means to said hinge body.

7. The invention of claim 1 wherein said battens and said longitudinal cross members are hollow and tubular and each of said actuator means comprises a rod telescoped within a tubular section.

8. The invention of claim 1 wherein three longeron means are connected, respectively, between the first and fourth, second and fifth and third and sixth joint means, said longeron means having hinge means at the mid point of their length so that said longeron means are adapted to collapse for stowing said truss structure.

9. The invention of claim 8 wherein said actuator means include means to store energy as said actuator means is extended in length to its stowed condition so that said energy can be used to deploy said truss structure when desired.

10. The invention of claim 9 wherein said means to store energy includes an elastic band which is stretched as said actuator means is extended in length.

11. The invention of claim 8 wherein, in the erected state, said seventh through ninth joint means lie outside the plane formed by said longerons and battens so that any axial load on said truss is distributed between said longerons and said cross members.

* * * * *